United States Patent Office 2,980,695
Patented Apr. 18, 1961

2,980,695

POLYFLUORO-1,3-DITHIETANES AND THEIR PREPARATION

William Joseph Middleton, Claymont, Del., assignor to E. I. du Pont de Nemours and Company, Wilmington, Del., a corporation of Delaware No Drawing. Filed June 12, 1957, Ser. No. 665,142

3 Claims. (Cl. 260—327)

This invention relates to novel inert fluorine- and sulfur-containing polymers and to a process for their preparation. The process of this invention is especially valuable since it provides a convenient method for making chemically inert polymers by simple steps from readily available raw materials.

The polymers of this invention are poly(thiocarbonyl fluorides) having the recurring structural units $\{SCF_2\}$ and having a molecular weight of at least 2000. Homopolymers as well as copolymers of thiocarbonyl fluoride with other ethylenically unsaturated materials capable of addition polymerization are included in this invention.

The method of preparing the polymers is as follows: Thiophosgene dimer (tetrachloro-1,3-dithietane) is fluorinated and the resulting polyfluoro-1,3-dithietane is pyrolyzed. The resulting thiocarbonyl fluoride is then polymerized.

The preparation of the polyfluoro-1,3-dithietane involves the reaction of tetrachloro-1,3-dithietane with antimony trifluoride. The proportions should be such that there is an amount of antimony trifluoride at least stoichiometrically equivalent to the tetrachlorodithietane present. Preferably an excess of antimony trifluoride, e.g., up to 100% excess or more can be present. A reaction medium which is a solvent for the antimony trifluoride, such as tetramethylene sulfone, is ordinarily present. Both tetrafluoro-1,3-dithietane and monochlorotrifluoro-1,3-dithietane are produced.

The temperature of reaction should be at least 90° C. and preferably between 90° and 200° C. Little reaction takes place at temperatures below 90° C.

Reaction pressures are not critical. Atmospheric pressure is quite satisfactory although subatmospheric or superatmospheric pressures can be used if desired. The use of low pressure such as less than atmospheric generally favors the formation of the monochlorotrifluoro-1,3-dithietane. The reaction time is not critical, periods ranging from 15 minutes to 2 hours at temperatures above 90° C. being satisfactory. At the termination of the reaction, the tetrafluoro-1,3-dithietane and monochlorotrifluoro-1,3-dithietane that are formed are isolated.

The fluorination of the tetrachloro-1,3-dithietane can also be accomplished by the use of hydrogen fluoride in the presence of antimony trifluoride, antimony pentafluoride or other fluorine carrier. In this embodiment the hydrogen fluoride used in excess acts as solvent for the reaction.

The novel polyfluoro-1,3-dithietanes are useful solvents. They dissolve iodine and are useful for extracting and reclaiming iodine from aqueous solutions. Moreover, they are stable at their boiling points and thus are also useful for vapor baths providing constant temperature conditions. The polyfluoro-1,3-dithietanes of this invention possessing at least three fluorine atoms, have the unexpected advantage over the known tetrachloro-1,3-dithietane of being thermally stable at their boiling points and hydrolytically stable at 100° C.

Thiocarbonyl fluorides are produced in the novel process of this invention by the pyrolysis of the aforementioned polyfluoro-1,3-dithietanes. Pyrolysis temperatures range from about 400° to 900° C., with temperatures of 450° to 500° C. being especially suitable. The reaction pressure is not critical, atmospheric, superatmospheric, or subatmospheric pressures all being operable. A convenient way of carrying out the pyrolysis is by passing the polyfluoro-1,3-dithietane through a reaction tube constructed of an inert metal such as nickel or platinum which has been heated to the reaction temperature. Preferably an inert diluent such as helium or nitrogen is passed through the reaction tube concurrently with the polyfluoro-1,3-dithietane as this improves the yield of the desired product.

When tetrafluoro-1,3-dithietane is pyrolyzed as described above, thiocarbonyl fluoride, $S=CF_2$, that contains less than 5% of sulfur- or fluorine-bearing non-polymerizable impurities is formed. This high degree of purity renders the product especially useful for polymerization. Thiocarbonyl fluoride of purity greater than 95% can be polymerized to chemically inert polymers of at least 2000 molecular weight, whereas thiocarbonyl fluoride of lesser purity and the known thiocarbonyl chloride cannot be polymerized to such polymers. Also, this highly pure product does not etch glass. Thiocarbonyl fluoride is useful for fumigation.

When monochlorotrifluoro-1,3-dithietane is pyrolyzed as described above, the product comprises a major proportion of thiocarbonyl fluoride and minor proportions of thiocarbonyl chlorofluoride and thiocarbonyl chloride. Thicarbonyl chlorofluoride is also useful for fumigation.

Thiocarbonyl fluoride of at least 95% purity prepared as described previously undergoes spontaneous polymerization on storage at ordinary temperature for periods ranging from 2 to 3 days to several weeks with the formation of solid polymers having recurring $\{S—CF_2\}$ units. Polymers of this invention range from low molecular weight, i.e., about 2000, waxy solids melting at about 35° C. to high molecular weight, high melting polymers that can be pressed at elevated temperatures and pressures into rubbery films. The higher molecular weight polymers are obtained by the use of high purity thiocarbonyl fluoride, with anionic polymerization initiators. The low molecular weight waxy polymers are insoluble in most common solvents but are soluble in chloroform. These chloroform solutions are useful for coating wood, metal or glass to give a chemically inert waxy finish.

In addition to the spontaneous polymerization described above, the thiocarbonyl fluoride of this invention containing less than 5% of sulfur- or fluorine-bearing non-polymerizable impurities can also be polymerized by itself or in combination with one or more ethylenically unsaturated polymerizable monomers in the presence of an addition polymerization initiator such as a free radical-liberating initiator, e.g., α,α′-azodiisobutyronitrile, or an anionic initiator, e.g., sodium cyanide, and triphenylphosphine. The anionic initiators are especially suitable for making high molecular weight polymers. These polymerizations can be carried out by either the bulk or solution methods at temperatures ranging from −50° up to 150° C. or higher. The operating pressure at which the polymerization is carried out is not critical.

Examples of ethylenically unsaturated monomers which can be copolymerized with thiocarbonyl fluoride include tetrafluoroethylene and vinyl fluoride. These comonomers can be employed with thiocarbonyl fluoride in proportions ranging from 1% to 95% by weight of the monomer composition.

The thiophosgene dimer (tetrachloro-1,3-dithietane) used as starting material in the process of this invention may be prepared by known methods. For example, it

EXAMPLE I

*Flourination of tetrachloro-1,3-dithietane*

A mixture of 108 g. (0.47 mole) of tetrachloro-1,3-dithietane.

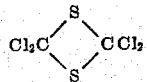

179 g. (1.0 mole) of antimony trifluoride and 250 ml. of tetramethylene sulfone is stirred and heated at 90–100° C. for 2 hours. The volatile reaction products are 66 g. of condensate which is distilled through an 18-inch condensed in a trap cooled with ice. There is obtained spinning band column. There is obtained 45.62 g., corresponding to a 60% yield, of tetrafluoro-1,3-dithietane,

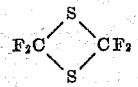

as a very light yellow liquid, B.P. 47–48° C., M.P. −8° C., $n_D^6$ 1.4028.

*Analysis.*—Calc'd for $C_2F_4S_2$: C, 14.63%; F, 46.30%; S, 39.06%. Found: C, 15.21%; F, 46.95%; S, 39.16%, 39.31%.

Tetrafluoro-1,3-dithietane can be purified by vigorous agitation with a mixture of 5 parts of 10% aqueous sodium hydroxide solution and 1 part of 30% aqueous hydrogen peroxide until the yellow color disappears, followed by drying of the lower organic layer over silica gel and distillation. The resulting highly purified tetrafluoro-1,3-dithietane is a colorless liquid, B.P. 49° C., M.P. −6° C., $n_D^{25}$ 1.3908, $d_4^{20}$ 1.6036.

There is obtained as a higher boiling fraction 5.72 g. of chlorotrifluoro-1,3-dithietane,

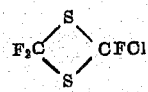

B.P. 89–90° C., $n_D^6$ 1.4615.

*Analysis.*—Calc'd for $C_2ClF_3S_2$: Cl, 19.63%; S, 35.50%. Found: Cl, 19.68%; S, 35.62%, 35.74%.

There is also isolated from the reaction mixture 7.83 g. of thiophosgene, $CSCl_2$, B.P. 73–76° C., $n_D^6$ 1.5904.

EXAMPLE II

*Pyrolysis of tetrafluoro-1,3-dithietane*

Forty grams of tetrafluoro-1,3-dithietane, purified as described in Example I, is added dropwise over a period of 2 hours to the top of a platinum tube ½-inch in diameter and 25 inches long inclined at an angle of 30° to the horizontal and heated to 500° C. over a length of 12 inches. A slow stream of helium (20 ml. per minute) is passed through the tube during the pyrolysis. The effluent gases are condensed in successive traps cooled by a mixture of acetone and carbon dioxide and liquid nitrogen, respectively. The material in the traps is combined and distilled through a 16-inch column packed with glass helixes. There is obtained 34.0 g. (85% yield) of colorless liquid, boiling at −54° C. Analysis of this product by the mass spectrometer indicates it to be thiocarbonyl fluoroide, $CSF_2$, of 98% purity.

EXAMPLE III

*Pyrolysis of chlorotrifluoro-1,3-dithietane*

Using the apparatus and procedure of Example II, 9.03 g. of chlorotrifluoro-1,3-dithietane is pyrolyzed during a period of 1 hour at 500° C. There is obtained is conveniently prepared by irradiation of thiophosgene with ultraviolet light as described by Schonberg and Stephenson, Ber. 66B, 567 (1933).

The invention is illustrated further by the following examples in which the proportions of ingredients are expressed in parts by weight unless otherwise noted.

by distillation of the condensates in the two cold traps 4.3 g. of nearly colorless thiocarbonyl fluoride, boiling at −54° C., 1.18 g. of yellow thiocarbonyl chlorofluoride CSFCl, boiling at 6° C. and 1.38 g. of red thiophosgene, $CSCl_2$, boiling at 72–74° C. Thiocarbonyl fluoride and thiocarbonyl chlorofluoride are identified by their nuclear magnetic resonance spectra and their mass spectrometer patterns.

EXAMPLE IV

*Preparation of poly(thiocarbonyl fluoride)*

Thiocarbonyl fluoride of 95.5% purity is placed in a stainless steel container and stored at room temperature for 6 weeks. The container is then opened and a clear syrupy residue is removed. After storage in a vacuum desiccator for 2 days, this residue solidifies to a white wax melting at 30–35° C. The polymer is not visibly affected by boiling concentrated nitric acid or by boiling 10% sodium hydroxide solution. The poly(thiocarbonyl fluoride) is soluble in chloroform and it can be reprecipitated from the chloroform solution by addition of methyl alcohol.

*Analysis.*—Calc'd for $(CF_2S)_n$: C, 14.63%; F, 46.30%; S, 39.06%. Found: C, 14.79%; F, 46.62%; S, 39.11%.

The molecular weight determination was made by dissolving a weighed amount of polymer in tetrachlorodifluoroethane, measuring the freezing point depression and calculating the molecular weight by standard procedures. In this example, 0.176 g. of polymer dissolved in 47.8 g. of tetrachlorodifluoroethane depressed the freezing point 0.077° C. This corresponds to a molecular weight of 2150.

EXAMPLE V

*Preparation of poly(thiocarbonyl fluoride)*

Three grams of thiocarbonyl fluoride and 0.03 g. of α,α′-azodiisobutyronitrile are placed in a platinum tube. The tube is then sealed and heated at 75° C. for 3 hours, 80° C. for 6 hours, and 85° C. for 3 hours at 3000 atmospheres pressure. After the reaction tube is cooled and opened, there is obtained 3.0 g. of waxy poly(thiocarbonyl fluoride) similar to the polymer of Example IV.

EXAMPLE VI

*Preparation of poly(thiocarbonyl fluoride)*

Thiocarbonyl fluoride is prepared as described in Example II by the pyrolysis of 20 g. of tetrafluoro-1,3-dithietane at 450° C. The freshly prepared thiocarbonyl fluoride is transferred under nitrogen to a 100-ml. flask cooled to −80° C. and connected to a condenser cooled by solid carbon dioxide. As the liquid thiocarbonyl fluoride is stirred by a magnetic stirrer, 1 ml. of a saturated solution of sodium cyanide in dimethyl formamide is introduced rapidly by means of a syringe. Within a few seconds the material in the flask begins to solidify. The flask is held at −80° C. for 2 hours, at the end of which time a solid white cake forms, which stops the stirrer. As the flask is warmed to room temperature, the top of the solid cake becomes black and gummy. The rubbery solid in the flask is cut into pieces and removed, and the black portion is cut away from the white. The white solid is washed with water and dried. There is obtained 3.1 g. of white poly(thiocarbonyl fluoride). A film is pressed at 180° C. and 10,000 lb./sq. in for 15 seconds. The film is white and rubbery. It loses it rubbery characteristic and becomes soft at 230° C. and decomposes into gaseous product at 270° C. The film is still flexible, although somewhat stiffer, when cooled to −80° C.

The black, gummy material obtained in this reaction is boiled with concentrated nitric acid for 30 minutes. Most of the color is removed and 9.7 g. of light yellow, rubbery poly(thiocarbonyl fluoride) is obtained. This material is also pressed into a rubbery film under the same conditions as the white product.

The polymer (both the white and the black portions) is insoluble in, and unaffected by boiling concentrated nitric acid, 10% aqueous sodium hydroxide, acetone, ethanol, methanol, dioxane, dimethyl sulfoxide, formamide, and sulfuric acid at 150° C.

EXAMPLE VII

*Preparation of poly(thiocarbonyl fluoride)*

Thiocarbonyl fluoride, 1.5 g., and tetrafluoro-1,3-dithietane (as solvent), 1.5 g., are sealed in a platinum tube and heated to 75° C. for 3 hours, 80° C. for 6 hours, and 85° C. for 3 hours at 3000 atmospheres pressure. After cooling, the tube is cut open and the sticky polymer is dissolved in chloroform and precipitated with methanol. There is obtained 1.2 g. of white waxy poly(thiocarbonyl fluoride), M.P. 35–40° C.

EXAMPLE VIII

*Preparation of poly(thiocarbonyl fluoride)*

Thiocarbonyl fluoride is prepared as described previously by the pyrolysis of 10 g. of purified tetrafluoro-1,3-dithietane at 450° C. A 500 ml. flask with an inlet and outlet tube and fitted with a magnetic stirrer and a condenser cooled by solid carbon dioxide is charged with 300 ml. of pentane (dried over sodium and passed through silica gel) and ¼ ml. of a saturated solution of sodium cyanide in dimethylformamide. The flask is flushed with nitrogen and 50 ml. of the pentane is distilled from the flask. The flask was then immersed in an acetone-solid carbon dioxide bath and the condenser is charged with acetone-solid carbon dioxide. The thiocarbonyl fluoride is then slowly distilled into the vigorously stirred pentane solution. A white suspension of polymer forms immediately. The reaction mixture is stirred for an additional two hours with cooling and is then allowed to warm to room temperature (about 25° C.). The polymer is collected on a filter, washed with methanol, then with dilute nitric acid, and finally with methanol again. It is dried in a vacuum desiccator over phosphorus pentoxide and paraffin for two days. There is obtained 8.5 g. (85% conversion from the dithietane) of a white, rubbery solid.

*Analysis.*—Calc'd for $(CSF_2)_n$: C, 14.63%; S, 39.06%; F, 46.30%. Found: C, 14.72%; S, 39.16%; F, 46.11%.

A transparent rubbery film is pressed from this polymer at 150° C. and 10,000 lb./sq. in. This film possesses a zero strength temperature of 231° C.

The thiocarbonyl fluoride polymers of this invention are especially useful because of the particular combination of properties that they posses. In addition to exhibiting a high degree of chemical inertness they are soluble in certain organic solvents and this solubility permits their use as coating compositions for application to various substrates such as wood, metal and glass. The high molecular weight polymers of this invention also possess melting points in the range which permits them to be shaped into various objects by extrusion, pressing or by molding or pressed into flexible self-supporting films that are chemically inert.

I claim:
1. Polyfluoro-1,3-dithietanes selected from the class consisting of tetrafluoro-1,3-dithietane and monochlorotrifluoro-1,3-dithietane.
2. Tetrafluoro-1,3-dithietane.
3. Monochlorotrifluoro-1,3-dithietane.

References Cited in the file of this patent

UNITED STATES PATENTS

| | | |
|---|---|---|
| 2,055,617 | Wiezevich | Sept. 29, 1936 |
| 2,534,366 | Noether | Dec. 19, 1950 |
| 2,538,941 | Macallum | Jan. 23, 1951 |
| 2,562,994 | Van Vleck | Aug. 7, 1951 |
| 2,570,793 | Gresham | Oct. 9, 1951 |
| 2,662,899 | Bashour | Dec. 15, 1953 |
| 2,701,253 | Jones | Feb. 1, 1955 |

OTHER REFERENCES

Emeleus: J. Chem. Soc. (London), vol. 3, pp. 2183–2186 (1948).

A. Schonberg et al.: Berichte, vol. 66 (1933), pp. 567–571.

G. A. R. Brandt et al.: J. Chem. Soc. (London), 1952, pp. 2198–2205.

W. E. Truce et al.: J. Am. Chem. Soc., vol. 74 (1952), pp. 3594–3599.

UNITED STATES PATENT OFFICE
CERTIFICATE OF CORRECTION

Patent No. 2,980,695　　　　　　　　　　　　　　April 18, 1961

William Joseph Middleton

It is hereby certified that error appears in the above numbered patent requiring correction and that the said Letters Patent should read as corrected below.

Column 3, line 9, in the title to EXAMPLE I, for "Flourination", in italics, read -- Fluorination --, in italics; line 19, strike out "66 g. of condensate which is distilled through an 18-inch" and insert the same after "obtained" in line 20, same column 3.

Signed and sealed this 2nd day of January 1962.

(SEAL)
Attest:

ERNEST W. SWIDER
Attesting Officer

DAVID L. LADD
Commissioner of Patents

USCOMM-DC